US012109891B2

(12) United States Patent
Justus et al.

(10) Patent No.: US 12,109,891 B2
(45) Date of Patent: Oct. 8, 2024

(54) ASSEMBLY OF A WHEEL HUB ON A WHEEL CARRIER FOR A VEHICLE, WHEEL HUB DRIVE FOR A VEHICLE, AND VEHICLE

(71) Applicant: AUDI AG, Ingolstadt (DE)

(72) Inventors: Winfried Justus, Ingolstadt (DE); Matthias Ewert, Ingolstadt (DE); Sascha Bornhold, Eitensheim (DE)

(73) Assignee: AUDI AG, Ingolstadt (DE)

(*) Notice: Subject to any disclaimer, the term of this patent is extended or adjusted under 35 U.S.C. 154(b) by 638 days.

(21) Appl. No.: 17/285,573

(22) PCT Filed: Oct. 30, 2019

(86) PCT No.: PCT/EP2019/079730
§ 371 (c)(1),
(2) Date: Apr. 15, 2021

(87) PCT Pub. No.: WO2020/094488
PCT Pub. Date: May 14, 2020

(65) Prior Publication Data
US 2021/0402868 A1 Dec. 30, 2021

(30) Foreign Application Priority Data

Nov. 6, 2018 (DE) ............... 10 2018 218 925.0

(51) Int. Cl.
*B60K 7/00* (2006.01)
*B60B 27/00* (2006.01)
(Continued)

(52) U.S. Cl.
CPC ........ *B60K 7/0007* (2013.01); *B60B 27/0068* (2013.01); *B60R 16/03* (2013.01);
(Continued)

(58) Field of Classification Search
CPC ... B60K 7/0007; B60B 27/0068; B60B 27/02; B60R 16/03; B60R 11/04;
(Continued)

(56) References Cited

U.S. PATENT DOCUMENTS

2007/0279203 A1* 12/2007 Thomas .............. B60C 23/0472
340/447
2009/0157257 A1* 6/2009 Voigtlaender ........ B60G 17/019
701/37
(Continued)

FOREIGN PATENT DOCUMENTS

DE 102006035534 A1 1/2008
DE 112007002204 T5 8/2009
(Continued)

OTHER PUBLICATIONS

Notification of Transmittal of Translation of the International Preliminary Report on Patentability issued on May 20, 2021, in connection with corresponding International Application No. PCT/EP2019/079730; 9 pages.
(Continued)

*Primary Examiner* — Erez Gurari
(74) *Attorney, Agent, or Firm* — Maier & Maier, PLLC

(57) ABSTRACT

An assembly of a wheel hub on a wheel carrier for a vehicle, in which the wheel hub, on which at least one wheel of the vehicle is fastenable in a rotationally-fixed manner, is rotatably mounted via a wheel bearing on the wheel carrier, including at least one surroundings sensor at least partially arranged in the wheel hub, by which at least a part of the surroundings of the vehicle can be registered.

13 Claims, 1 Drawing Sheet

(51) Int. Cl.
  *B60R 16/03*   (2006.01)
  *B60B 27/02*   (2006.01)
  *B60R 11/00*   (2006.01)
  *B60R 11/04*   (2006.01)
  *G01S 13/931*  (2020.01)

(52) U.S. Cl.
  CPC ......... *B60B 27/02* (2013.01); *B60R 2011/004* (2013.01); *B60R 11/04* (2013.01); *G01S 13/931* (2013.01); *G01S 2013/9323* (2020.01); *G01S 2013/9324* (2020.01); *G01S 2013/93274* (2020.01)

(58) Field of Classification Search
  CPC ............. B60R 2011/004; G01S 13/931; G01S 2013/9323; G01S 2013/9324; G01S 2013/93274; B60W 2422/70–80
  See application file for complete search history.

(56) References Cited

U.S. PATENT DOCUMENTS

| | | | |
|---|---|---|---|
| 2011/0133542 A1 | 6/2011 | Ratti et al. | |
| 2012/0112896 A1* | 5/2012 | Clair | A01B 69/008 701/1 |
| 2013/0012350 A1 | 1/2013 | Ebner | |
| 2014/0002253 A1* | 1/2014 | Yilmaz | G01S 7/003 340/435 |
| 2014/0152076 A1 | 6/2014 | Vogler et al. | |
| 2016/0291149 A1 | 10/2016 | Zeng et al. | |
| 2017/0153329 A1 | 6/2017 | Kodama | |
| 2017/0334516 A1 | 11/2017 | Ferguson | |
| 2021/0402868 A1* | 12/2021 | Justus | B60K 7/0007 |

FOREIGN PATENT DOCUMENTS

| | | |
|---|---|---|
| DE | 102010063742 A1 | 6/2012 |
| DE | 102011118685 A1 | 5/2013 |
| DE | 102016106298 A1 | 10/2016 |
| DE | 102016215510 A1 | 2/2017 |
| DE | 102016218628 A1 | 3/2018 |
| DE | 102017207103 A1 | 10/2018 |
| JP | 2015109799 A | 6/2015 |
| KR | 100771276 B1 | 10/2007 |
| KR | 20140067397 A | 6/2014 |
| WO | 2011/098594 A1 | 8/2011 |
| WO | 2013/114027 A1 | 8/2013 |

OTHER PUBLICATIONS

Office Action issued on Nov. 20, 2023, in corresponding Chinese Application No. 201980072908.4, 16 pages.
German Examination Report issued on Oct. 18, 2019 in corresponding German Application No. 10 2018 218 925.0; 20 pages; Machine translation attached.
German Examination Report issued on Feb. 20, 2020 in corresponding German Application No. 10 2018 218 925.0; 16 pages; Machine translation attached.
International Search Report (with English translation) and Written Opinion (with Machine translation) issued on Feb. 4, 2020 in corresponding International Application No. PCT/EP2019/079730; 20 pages.
Examination Report issued on Apr. 10, 2024, in corresponding German Application No. 10 2018 218 925.0, 10 pages.
Office Action issued on May 27, 2024, in corresponding Chinese Application No. 201980072908.4, 6 pages.

* cited by examiner

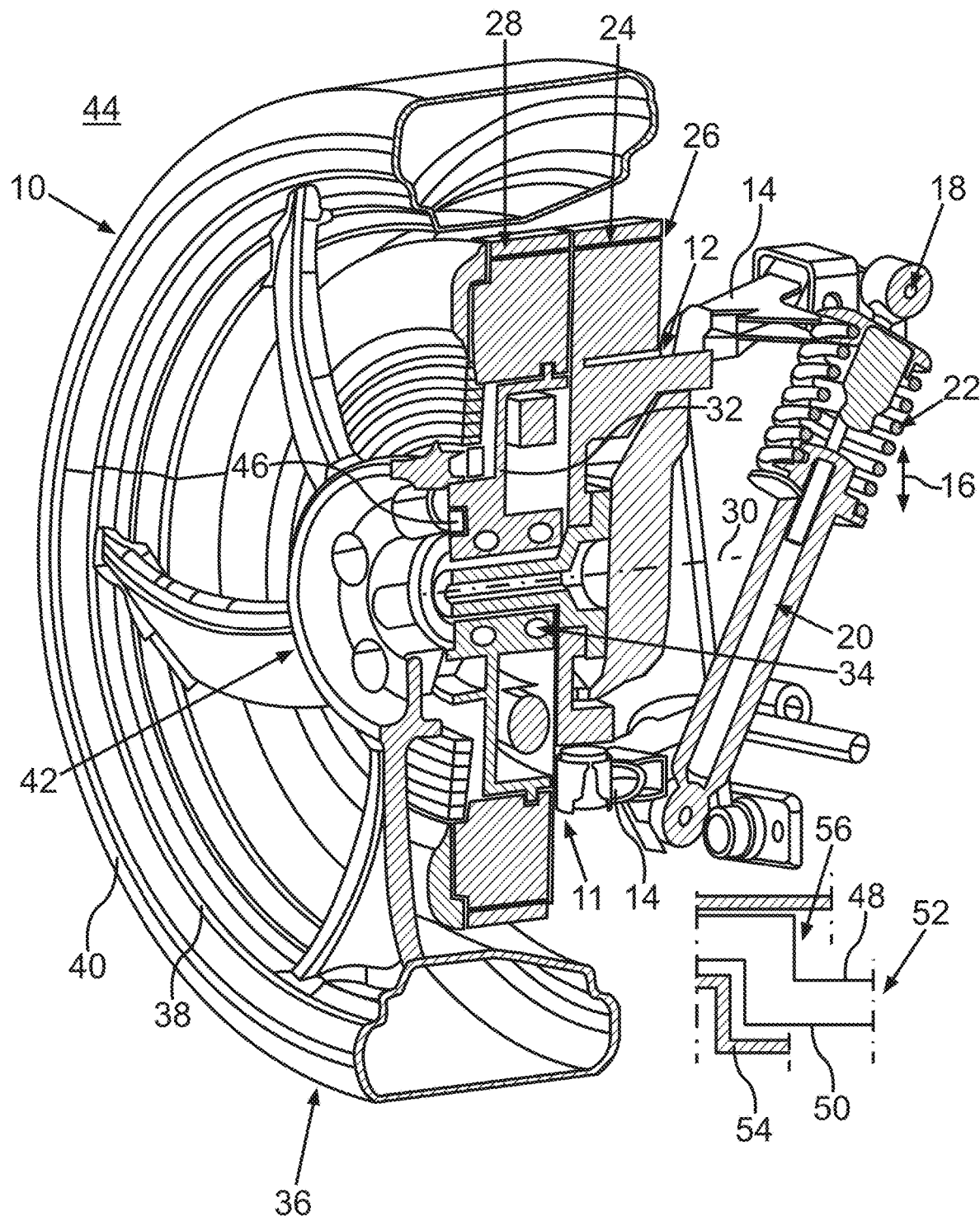

ASSEMBLY OF A WHEEL HUB ON A WHEEL CARRIER FOR A VEHICLE, WHEEL HUB DRIVE FOR A VEHICLE, AND VEHICLE

FIELD

The invention relates to an assembly of a wheel hub on a wheel carrier for a vehicle, in particular for a motor vehicle. In addition, the invention relates to a wheel hub drive for a motor vehicle according. The invention also relates to a motor vehicle, in particular a motor vehicle.

BACKGROUND

WO 2013/114027 A1 discloses a parking assistance system for a vehicle, having a sensor, by means of which a distance between the sensor and an obstacle can be registered. The sensor is positioned on a wheel of the vehicle.

SUMMARY

The object of the present invention is to provide an assembly, a wheel hub drive, and a motor vehicle, so that at least a part of the surroundings of the motor vehicle can be registered in a particularly simple manner.

This object is achieved according to the invention by an assembly, by a wheel hub drive, and by a vehicle.

A first aspect of the invention relates to an assembly of a wheel hub on a wheel carrier for a vehicle, in particular for a motor vehicle, which can be designed, for example, as an automobile, in particular as a passenger vehicle. In the completely produced state, the vehicle comprises a body, for example, designed as a self-supporting vehicle body, wherein the wheel carrier is held immovably on the structure at least indirectly, in particular via at least one wheel suspension arm, or via multiple wheel suspension arms. In particular, the wheel carrier is held at least indirectly sprung and/or damped on the body, so that relative movements between the wheel carrier and the body are sprung and/or damped or are to be sprung and/or damped by means of a spring and/or damper device. In particular, the wheel carrier is held immovably on the body relative to the body in the vehicle vertical direction, for example, so that the wheel carrier can move at least translationally relative to the body in the vehicle vertical direction, for example. Therefore, for example, the wheel carrier can retract and extend relative to the body. Furthermore, it is conceivable that the wheel carrier is pivotable around a pivot axis, also referred to as a steering axis, relative to the body and is thus to be steered. This is the case in particular if a steered or steerable wheel is to be held or is held on the body via the wheel carrier. The wheel carrier and the wheel held at least indirectly on the wheel carrier can then, for example, be pivoted around the pivot axis relative to the body and thus steered, whereby cornering or direction changes of the vehicle can be effectuated in particular by its driver. For this purpose, the driver actuates, for example, a steering handle arranged in the interior of the vehicle, for example a steering wheel, in particular in such a way that the driver moves the steering handle relative to the body, in particular rotates it around an axis of rotation.

In the assembly, the wheel held is rotatably mounted on the wheel carrier via a wheel bearing. A wheel of the vehicle, which is formed separately from the wheel hub and is provided additionally to the wheel hub, is fastenable in a rotationally-fixed manner on the wheel hub. The wheel can thus become or be rotatably mounted on the wheel carrier using the wheel hub. The wheel is a ground contact element, via which the vehicle is supportable or supported downward on the ground in the vehicle vertical direction in its completely produced state. If the vehicle is driven along the ground while the vehicle is supported downward via the wheel on the ground in the vehicle vertical direction, the wheel thus rolls along the ground or on the ground.

To now be able to register at least a part of the surroundings of the vehicle in a particularly simple and cost-effective manner, at least one surroundings sensor arranged at least partially in the wheel hub is provided according to the invention, by means of which at least the above-mentioned part of the surroundings of the vehicle can be registered. In this way, the surroundings sensor, which can also be referred to simply as a sensor, is integrated in a particularly simple and cost-effective manner into the vehicle. Surroundings sensors are typically integrated in respective bodies of vehicles, which are designed, for example, as self-supporting vehicle bodies.

An external appearance, also referred to as a design, of the vehicle body and in particular its construction or development therefore typically has to be adapted to the conventionally provided integration of sensors into the vehicle body. The goal in this case is typically to provide an advantageous visual impression of the vehicle body having the sensors integrated therein. Problems result therefrom upon the selection of a respective installation location of the respective sensor, in particular in consideration of the design of the vehicle body. In contrast, for example, to the case of a front or rear sensor, in particular in the case of a front or rear radar, an open installation of a lateral sensor designed, for example, as a lateral radar, by means of which a part of the surroundings arranged to the left or right adjacent to the vehicle at least in the vehicle transverse direction can be registered, is typically only possible with negative effects on a desired, advantageous, and classic design of the vehicle body. In particular for future vehicles and future applications, for example in the field of piloted or autonomous driving, however, the use of lateral sensors is advantageous to implement safe operation and extensive functions.

Since it is provided according to the invention that the surroundings sensor is arranged at least partially in the wheel hub and is therefore accommodated at least partially inside the wheel hub, the surroundings sensor can be installed at or in the vehicle without having to influence its body or the external impression of the body of the vehicle undesirably. At the same time, by means of the surroundings sensor, a part of the surroundings arranged to the left or right adjacent to the vehicle in the vehicle transverse direction can particularly advantageously be registered. In particular the body or its design can remain completely uninfluenced by the use of the surroundings sensor, since the surroundings sensor is not integrated in the body but in the wheel hub. In particular, the assembly according to the invention enables compromises between an installation location of the sensor, the design of the body, and a function or a performance of the surroundings sensor to be dispensed with. While if sensors are integrated into the vehicle body, for example, redevelopment with respect to the integration of the respective sensor into the vehicle body is necessary for each vehicle derivative, this can be avoided by the assembly according to the invention. In other words, the integration of the surroundings sensor is independent of the body and its design and can be used in a derivative-spanning manner as an identical part, in particular as a part of the wheel hub or the wheel carrier.

It is possible that the surroundings sensor is co-rotatable about with the wheel hub relative to the wheel carrier. The surroundings sensor is connected in a rotationally-fixed manner to the wheel hub here, for example. Alternatively, however, it is possible that the wheel hub is rotatable relative to the surroundings sensor and relative to the wheel carrier. The surroundings sensor is preferably held here at least in a rotationally-fixed manner on the wheel carrier and is thus secured against rotations taking place relative to the wheel carrier. The surroundings sensor is thus not co-rotatable with the wheel held relative to the wheel carrier, whereby at least the part of the surroundings can be registered particularly well.

It has been shown to be particularly advantageous if the surroundings sensor is held directly on the wheel hub. This is to be understood in particular to mean that the surroundings sensor directly contacts or touches the wheel hub. The surroundings sensor can thus be integrated in a particularly space-saving manner into the wheel hub and fastened on the wheel hub.

It has furthermore proven to be advantageous if the surroundings sensor is held directly on the wheel carrier. This is to be understood in particular to mean that the surroundings sensor directly contacts or touches the wheel carrier. The surroundings sensor can thus be integrated in a particularly space-saving manner into the wheel hub and fastened on the wheel carrier and thus secured against rotations relative to the wheel carrier.

To implement a particularly simple, space-saving, and cost-effective integration of the surroundings sensor into the wheel hub, it is provided in a further embodiment of the invention that the surroundings sensor is arranged at least predominantly, in particular completely, inside the wheel hub, i.e., is accommodated in the wheel hub.

In one particularly advantageous embodiment of the invention, the surroundings sensor includes at least one camera, by means of which images of at least a part of the surroundings can be registered and thus recorded. Alternatively or additionally, the surroundings sensor includes a radar sensor and/or at least one ultrasonic sensor and/or at least one laser sensor and/or at least one lidar sensor. A particularly high performance with respect to registering the part of the surroundings can thus be implemented in a cost-effective manner.

A further embodiment is distinguished in that the assembly includes a wheel hub motor designed as an electrical machine. The wheel hub motor comprises a stator and a rotor, which is drivable by the stator and is thus rotatable relative to the stator, in particular around an axis of rotation. The rotor comprises the wheel hub mounted rotatably on the wheel carrier via the wheel bearing, so that the wheel hub is drivable by the stator and is thus rotatable around the axis of rotation relative to the wheel carrier. The rotor is thus rotatable around the axis of rotation relative to the wheel carrier. In this embodiment, synergies can be implemented or provided between the wheel hub motor and the sensor, so that an electrical drive, in particular solely electrical, and thus of the vehicle may be implemented by means of the wheel hub motor in a particularly advantageous manner. At the same time, at least the part of the surroundings can advantageously be registered.

It has proven to be advantageous here if at least one first cable is provided, via which the wheel hub motor can be supplied with electrical energy or electrical current. To drive the rotor by means of the stator, the wheel hub motor is supplied with electrical energy via the first cable. In addition, at least one second cable is provided, which is formed separately from the first cable and is provided in addition to the first cable, and by which the surroundings sensor can be supplied with electrical energy or electrical current. Alternatively or additionally, the surroundings sensor can provide data, which are also referred to as surroundings data and characterize the part of the surroundings registered by means of the surroundings sensor, from the surroundings sensor. The surroundings data can be received, for example, by an electronic processing device, in particular of the vehicle, so that as a result, for example, the vehicle can be operated by means of the electronic processing device as a function of the data and thus as a function of the surroundings registered by means of the surroundings sensor. In particular, the electronic processing device can operate, in particular control or regulate, for example, the wheel hub motor as a function of the data and thus as a function of the surroundings registered by means of the surroundings sensor. The electronic processing device is also referred to, for example as a control unit and/or can be part of the vehicle. The cables are brought together to form a cable strand. In this way, the surroundings sensor can be integrated particularly simply and cost-effectively into the vehicle, and the vehicle can be equipped particularly simply and cost-effectively with the wheel hub motor, since, for example, during production or assembly of the vehicle, laying of the cables can take place simultaneously and can thus be accompanied by laying and thus assembly of the cable strand.

To be able to equip the vehicle with both the wheel hub sensor and also the surroundings sensor in a particularly simple and cost-effective manner, it is provided in a further embodiment of the invention that the cables extend at least partially in a jacket of the cable strand shared by the cables and are held against one another by means of the jacket.

A further embodiment is distinguished by at least one line element shared by the surroundings sensor and the wheel hub sensor, via which both the wheel hub motor and also the surroundings sensor can be supplied with electrical energy or electrical current. Moreover, the above-described surroundings data can be provided by the surroundings sensor via the line element. In this way, the number of parts and thus the costs, the weight, and the space requirement can be kept particularly low, wherein the vehicle can be equipped with both the wheel hub motor and also the sensor.

A second aspect of the invention relates to a wheel hub drive for a vehicle, in particular for a motor vehicle. The wheel hub drive comprises a wheel carrier and also a wheel hub motor designed as an electrical machine. The wheel hub motor comprises a stator and a rotor drivable by the stator and thus rotatable relative to the stator. The rotor comprises a wheel hub which is rotatably mounted on the wheel carrier via a wheel bearing. At least one wheel of the vehicle is fastenable or fastened in a rotationally-fixed manner on the wheel hub.

To be able to register at least a part of the surroundings of the vehicle in a particularly simple and cost-effective manner, at least one surroundings sensor arranged at least partially in the wheel hub is provided according to the invention, by means of which at least the above-mentioned part of the surroundings of the vehicle can be registered. Advantages and advantageous embodiments of the first aspect of the invention are to be considered advantages and advantageous embodiments of the second aspect of the invention and vice versa.

A third aspect of the invention relates to a vehicle, preferably designed as a motor vehicle, in particular as an automobile and particularly preferably as a passenger vehicle, which comprises at least one assembly according to the first aspect of the invention and/or at least one wheel hub drive according to the second aspect of the invention. Advantages and advantageous embodiments of the first aspect and the second aspect of the invention are to be considered advantages and advantageous embodiments of the third aspect of the invention and vice versa.

The vehicle according to the invention can be equipped with an electrical drive and can thus be designed as an electric vehicle, in particular as a battery-electric vehicle. The vehicle is thus electrically drivable by means of the wheel hub drive, in particular solely or exclusively. The wheel carrier can be assigned to a front axle, so that, for example, the wheel fastenable or fastened in a rotationally-fixed manner on the wheel hub is a front wheel. The wheel can be a steerable or steered wheel. Furthermore, it is conceivable that the wheel carrier is assigned to a rear axle, so that, for example the wheel is designed as a rear wheel.

The invention also includes refinements of the second aspect and the third aspect of the invention, which have features as have already been described in conjunction with the refinements of the first aspect of the invention. For this reason, the corresponding refinements of the second and the third aspect of the invention are not described once again here. The invention also comprises combinations of the features of the described embodiments.

BRIEF DESCRIPTION OF THE FIGURES

An exemplary embodiment of the invention is described hereinafter.

The FIGURE shows a schematic and sectional perspective view of a wheel hub drive according to the invention for a vehicle preferably designed as an automobile, in particular as a passenger vehicle.

DETAILED DESCRIPTION

The exemplary embodiment explained hereinafter is a preferred embodiment of the invention. In the exemplary embodiment, the described components of the embodiments each represent individual features of the invention to be considered independently of one another, which each also refine the invention independently of one another. Therefore, the disclosure is also to comprise combinations of the features of the embodiments other than those shown. Furthermore, the described embodiments can also be supplemented by further ones of the features of the invention already described.

The single FIGURE shows, in a schematic and sectional perspective view, an electrical drive device in the form of a wheel hub drive 10 for a vehicle, which in the exemplary embodiment shown is designed as a motor vehicle and preferably as an automobile, in particular as a passenger vehicle. The motor vehicle has a body in its completely produced state, which is designed, for example, as a self-supporting vehicle body. The vehicle body has an outer skin, which can be visually and haptically perceived as such by persons located in the respective surroundings of the motor vehicle. In other words, the respective person located in the surroundings can observe and touch the outer skin.

The wheel hub drive 10 is designed to at least or exclusively electrically drive the motor vehicle. For this purpose, the wheel hub drive 10 comprises a wheel carrier 12, which is held movably on the vehicle body via respective wheel suspension arms 14, also simply referred to as suspension arms. The wheel carrier 12 is movable, in particular translationally, for example at least in the vehicle vertical direction relative to the vehicle body, so that the wheel carrier can retract and extend relative to the vehicle body. The vehicle vertical direction is illustrated in the FIGURE by a double arrow 16. A spring and/or damper device 18 is assigned to the wheel carrier 12, which in the present case includes a damper 20, also referred to as a shock absorber and designed as a hydraulic damper, and a spring 22. The spring 22 is a mechanical spring and is designed, for example, as a coiled spring. By means of the spring and/or damper device 18, the above-described relative movements between the wheel carrier 12 and the vehicle body are sprung and/or damped.

The wheel hub drive 10 additionally comprises a wheel hub motor 24 designed as an electrical machine, which comprises a stator 26 and a rotor 28. The stator 26 is fastened at least indirectly, in particular directly, on the wheel carrier 12, so that relative rotations do not occur between the stator 26 and the wheel carrier 12. The rotor 28 is drivable by the stator 26, and thus is rotatable around an axis of rotation 30 relative to the stator 26 and thus relative to the wheel carrier 12 around the axis of rotation 30. The wheel hub motor 24 can be operated, for example in a motor mode and thus as an electric motor. In the motor mode, the wheel hub motor 24 is supplied with electrical energy or electrical current. In this way, the rotor 28 is driven by the stator 26 and is thus rotated around the axis of rotation 30 relative to the wheel carrier 12. Furthermore, it is conceivable that the wheel hub motor 24 is operable in a generator mode and thus as a generator. In this case, the rotor 28 is driven by kinetic energy of the moving vehicle, which is driving along the ground, for example, and is thus rotated relative to the stator 26 around the axis of rotation 30. Thus, for example, at least a part of the kinetic energy of the motor vehicle is converted by means of the generator into electrical energy, which is provided by the wheel hub motor 24 and can be supplied, for example to at least one electrical consumer and/or can be stored in a storage unit, designed as a battery, for example, for storing electrical energy. The battery is part of the motor vehicle, for example. In the motor mode, the wheel hub motor 24 is supplied, for example with electrical energy which is stored in the battery.

The wheel hub drive 10 additionally comprises a wheel hub 32, which is part of the rotor 28. The wheel hub 32 is rotatably mounted on the wheel carrier 12 via at least one or precisely one wheel bearing 34, so that the wheel hub 32 is rotatable around the axis of rotation 30 relative to the wheel carrier 12. The wheel bearing 34 comprises, for example at least one roller bearing or multiple roller bearings, so that the wheel hub 32 is mounted rotatably on the wheel carrier 12 in a particularly low-friction and thus low-loss manner. The wheel hub 32 can also execute the above-described retraction and extension movements of the wheel carrier 12. Since the wheel hub 32 is held on the wheel carrier 12 and is rotatably mounted via the wheel bearing 34 on the wheel carrier 12, an assembly 11 of the wheel hub 32 on the wheel carrier 12 is provided. In the assembly 11, the wheel hub 32 is rotatably mounted via the wheel bearing 34 on the wheel carrier 12.

A wheel 36 of the motor vehicle is fastenable or fastened in a rotationally-fixed manner on the wheel hub 32. The wheel 36 can be part of the wheel hub drive 10. The wheel 36 comprises a rim 38 and a tire 40 pulled onto the rim 38. The rim 38 has a central fastening region 42, via which the rim 38 is connected in a rotationally-fixed manner to the wheel hub 32. The wheel 36 as a whole is thus connected in a rotationally-fixed manner to the wheel hub 32, so that the wheel 36 co-rotates or can co-rotate with the wheel hub 32 around the axis of rotation 30 relative to the wheel carrier 12.

The wheel 36 is thus supportable or supported on the vehicle body in a sprung and/or damped manner via the wheel hub 32 and the wheel carrier 12.

Since the wheel hub 32 is part of the rotor 28, and since the rotor 28 can be driven in the described manner by the stator 26, and since the wheel 36 is fastenable or fastened in a rotationally-fixed manner on the wheel hub 32 via the rim 38, the wheel 36 can be driven by the rotor 28 and thus via the rotor 28 by the stator 26. In this way, the wheel 36 and thus the motor vehicle can be electrically driven. An electrical drive of the motor vehicle can thus be implemented by the wheel hub drive 10.

To be able to register at least a part of the surroundings, denoted by 44 in the FIGURE, of the motor vehicle or the wheel 36 in a particularly simple and precise manner, the wheel hub drive 10 has at least one surroundings sensor 46, which is at least partially, in particular at least predominantly or completely, arranged in the wheel hub 32 and is simply also referred to as a sensor, by means of which the at least one above-mentioned part of the surroundings 44 can be registered. For this purpose, the rim 38 has, for example, at least one passage opening assigned to the surroundings sensor 46, which opens into the surroundings 44, on the one hand, and at the surroundings sensor 46, on the other hand.

The surroundings sensor 46 can register at least the above-mentioned part of the surroundings 44, for example via the passage opening or through the passage opening of the rim 38. The mentioned part of the surroundings 44 is arranged, for example, on the left or right in the vehicle transverse direction adjacent to the wheel 36 and thus adjacent to the motor vehicle. Because the surroundings sensor 46 is arranged at least partially, in particular at least predominantly or completely, in the wheel hub 32, the surroundings sensor 46 is integrated into the wheel hub 32. In this way, the sensor does not have to be integrated into the vehicle body and in particular not into the outer skin, so that undesired negative effects of the vehicle body and in particular of the outer skin due to using the surroundings sensor 46 can be avoided. Moreover, synergies between the wheel hub motor 24 and the surroundings sensor 46 can be used, so that the motor vehicle can be equipped cost-effectively with both the wheel hub motor 24 and also the surroundings sensor 46. For this purpose, for example, at least one first cable 48, which is shown particularly schematically in the FIGURE, is provided, via which the wheel hub motor 24 can be supplied with electrical energy, in particular for operating the wheel hub motor 24 in the motor mode.

In addition, for example, at least one second cable 50, which is formed separately from the first cable 48 and is provided in addition to the first cable 48, is provided, via which the surroundings sensor 46 can be supplied with electrical energy or with electrical current, in particular for operating the surroundings sensor 46. Alternatively or additionally, the surroundings sensor 46 can also provide data referred to as surroundings data via the cable 50, which characterize at least a part of the surroundings 44 registered by the surroundings sensor 46. The cables 48 and 50 are brought together to form a cable strand 52. In this way, for example, during production or during assembly of the motor vehicle, the cables 48 and 50 can be laid simultaneously or jointly, so that the motor vehicle can be equipped simply and cost-effectively with the wheel hub motor 24 and with the surroundings sensor 46. The cables 48 and 50 are preferably accommodated in a jacket 54 of the cable strand 52 shared by the cables 48 and 50, so that at least respective longitudinal regions of the cables 48 and 50 extend in the jacket 54, in particular in a receptacle space 56 delimited by the jacket 54. The cables 48 and 50 are held against one another by the jacket 54. In this way, the cables 48 and 50 can be laid in a particularly simple and thus cost-effective manner. Furthermore, it is conceivable that the surroundings sensor 46 can be supplied with data, for example, via the cable 50 and thus receives data via the cable 50, which are provided, for example, by an electronic processing device of the motor vehicle.

To be able to register at least a part of the surroundings 44 particularly precisely, the surroundings sensor 46 has, for example, at least one camera and/or at least one radar sensor and/or at least one ultrasonic sensor and/or at least one lidar sensor and/or at least one laser sensor. Moreover, the surroundings sensor 46 is held directly on the wheel hub 32, so that the surroundings sensor 46 directly touches the wheel hub 32.

The invention claimed is:

1. An assembly of a wheel hub on a wheel carrier for a vehicle, comprising: the wheel hub, on which at least one wheel of the vehicle is fastenable in a rotationally-fixed manner, is rotatably mounted via a wheel bearing on the wheel carrier, wherein at least one surroundings sensor is at least partially arranged in the wheel hub, by which at least a part of the surroundings of the vehicle can be registered, wherein the surroundings sensor is held directly on the wheel hub or directly on the wheel carrier.

2. The assembly as claimed in claim 1, wherein the surroundings sensor is arranged completely inside the wheel hub.

3. The assembly as claimed in claim 1, wherein the surroundings sensor comprises at least one camera and/or at least one radar sensor and/or at least one ultrasonic sensor and/or at least one laser sensor and/or at least one lidar sensor.

4. The assembly as claimed in claim 1, wherein a wheel hub motor designed as an electrical machine, which has a stator and a rotor drivable by the stator and thus rotatable relative to the stator, which comprises the wheel hub rotatably mounted on the wheel carrier via the wheel bearing, on which the wheel of the vehicle is fastenable in a rotationally-fixed manner.

5. The assembly as claimed in claim 4, wherein at least one first cable, via which the wheel hub motor can be supplied with electrical energy; and
at least one second cable, which is formed separately from the first cable and is provided in addition to the first cable, and via which the surroundings sensor can be supplied with electrical energy and/or data, which characterize the part of the surroundings registered by the surroundings sensor, can be provided by the surroundings sensor, wherein the cables are brought together to form a cable strand.

6. The assembly as claimed in claim 5, wherein the cables extend at least partially in a jacket of the cable strand shared by the cables and are held against one another by the jacket.

7. The assembly as claimed in claim 4, further comprising at least one line element shared by the surroundings sensor and the wheel hub motor, wherein both the wheel hub motor and the surroundings sensor are configured to be supplied with electrical energy via the at least one line element, and wherein the surroundings sensor is configured to provide data which characterize the part of the surroundings registered by the surroundings sensor via the at least one line element.

8. The assembly as claimed in claim 2, wherein the surroundings sensor comprises at least one camera and/or at least one radar sensor and/or at least one ultrasonic sensor and/or at least one laser sensor and/or at least one lidar sensor.

9. The assembly as claimed in claim 2, wherein a wheel hub motor designed as an electrical machine, which has a stator and a rotor drivable by the stator and thus rotatable relative to the stator, which comprises the wheel hub rotatably mounted on the wheel carrier via the wheel bearing, on which the wheel of the vehicle is fastenable in a rotationally-fixed manner.

10. The assembly as claimed in claim 3, wherein a wheel hub motor designed as an electrical machine, which has a stator and a rotor drivable by the stator and thus rotatable relative to the stator, which comprises the wheel hub rotatably mounted on the wheel carrier via the wheel bearing, on which the wheel of the vehicle is fastenable in a rotationally-fixed manner.

11. The assembly as claimed in claim 5, further comprising at least one line element shared by the surroundings sensor and the wheel hub motor, wherein both the wheel hub motor and the surroundings sensor are configured to be supplied with electrical energy via the at least one line element, and wherein the surroundings sensor is configured to provide data which characterize the part of the surroundings registered by the surroundings sensor via the at least one line element.

12. The assembly as claimed in claim 6, further comprising at least one line element shared by the surroundings sensor and the wheel hub motor, wherein both the wheel hub motor and the surroundings sensor are configured to be supplied with electrical energy via the at least one line element, and wherein the surroundings sensor is configured to provide data which characterize the part of the surroundings registered by the surroundings sensor via the at least one line element.

13. A wheel hub drive for a vehicle, having a wheel carrier, and having a wheel hub motor designed as an electrical machine, which has a stator and a rotor drivable by the stator and thus rotatable relative to the stator, which comprises a wheel hub rotatably mounted via a wheel bearing on the wheel carrier, and on which a wheel of the vehicle is fastenable in a rotationally-fixed manner,
    wherein at least one surroundings sensor at least partially arranged in the wheel hub, by which at least a part of the surroundings of the vehicle can be registered,
    wherein the surroundings sensor is held directly on the wheel hub or directly on the wheel carrier.

\* \* \* \* \*